(12) United States Patent
Sollenlid et al.

(10) Patent No.: US 11,214,110 B2
(45) Date of Patent: Jan. 4, 2022

(54) WORKING MACHINE AND A METHOD FOR SUSPENDING A WORKING MACHINE

(71) Applicant: Volvo Construction Equipment AB, Eskilstuna (SE)

(72) Inventors: Lena Sollenlid, Växjö (SE); Peter Johansson, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 159 days.

(21) Appl. No.: 16/491,622

(22) PCT Filed: Mar. 7, 2018

(86) PCT No.: PCT/EP2018/055585
§ 371 (c)(1),
(2) Date: Sep. 6, 2019

(87) PCT Pub. No.: WO2018/162543
PCT Pub. Date: Sep. 13, 2018

(65) Prior Publication Data
US 2021/0129612 A1    May 6, 2021

(30) Foreign Application Priority Data
Mar. 7, 2017    (EP) .................................. 17159616

(51) Int. Cl.
*B60G 9/00* (2006.01)
*B60G 11/27* (2006.01)
(Continued)

(52) U.S. Cl.
CPC .............. *B60G 9/00* (2013.01); *B60G 11/27* (2013.01); *B60G 11/28* (2013.01); *B60P 1/04* (2013.01);
(Continued)

(58) Field of Classification Search
CPC .......... B60G 9/00; B60G 11/27; B60G 11/28; B60G 2204/126
See application file for complete search history.

(56) References Cited

U.S. PATENT DOCUMENTS

| | | | |
|---|---|---|---|
| 7,111,857 B2 * | 9/2006 | Timoney | B60G 3/145 280/124.128 |
| 10,246,132 B2 * | 4/2019 | Leier | B62D 21/152 |

(Continued)

FOREIGN PATENT DOCUMENTS

| | | |
|---|---|---|
| CH | 381102 A | 8/1964 |
| DE | 102004041427 A1 | 3/2006 |
| WO | WO2013095207 A1 | 6/2013 |

OTHER PUBLICATIONS

International Search Report and Written Opinion of the International Searching Authority, PCT/EP2018/055585, dated May 15, 2018, 11 pages.

*Primary Examiner* — Faye M Fleming
(74) *Attorney, Agent, or Firm* — Sage Patent Group

(57) ABSTRACT

The invention relates to a working machine comprising a working machine frame, at least one propulsion axle having an elongated main body comprising a first end portion, a second end portion and a center portion arranged between the first and second end portions. The elongated main body has a main body length (MBL) extending from the first end portion to the second end portion. The working machine further comprises a propulsion axle suspension arrangement arranged between the working machine frame and the propulsion axle, the propulsion axle suspension arrangement comprising a first suspension device and a second suspension device arranged on opposite sides of a center of the elongated main body. The first and second suspension devices are arranged in the center portion of the elongated main body.

14 Claims, 4 Drawing Sheets

(51) Int. Cl.
*B60G 11/28* (2006.01)
*B60P 1/04* (2006.01)

(52) U.S. Cl.
CPC .. *B60G 2200/315* (2013.01); *B60G 2202/152* (2013.01); *B60G 2204/126* (2013.01)

(56) References Cited

U.S. PATENT DOCUMENTS

| | | |
|---|---|---|
| 10,639,952 B2 * | 5/2020 | Brown ................. B60G 21/026 |
| 2007/0199763 A1 | 8/2007 | Henze et al. |
| 2020/0055437 A1 * | 2/2020 | Sollenlid ................... B60P 1/28 |
| 2020/0122541 A1 * | 4/2020 | Larsson ............. B60G 17/0164 |

* cited by examiner

WORKING MACHINE AND A METHOD FOR SUSPENDING A WORKING MACHINE

CROSS REFERENCE TO RELATED APPLICATIONS

This application is a 35 U.S.C. § 371 national stage application of PCT International Application No. PCT/EP2018/055585 filed on Mar. 7, 2018, which in turn claims priority to European Patent Application No. 17159616.6 filed on Mar. 7, 2017, the disclosures and content of which are incorporated by reference herein in their entirety.

TECHNICAL FIELD

The invention relates to a working machine having a propulsion axle suspension arrangement and to a method for suspending a working machine relative a propulsion axle.

BACKGROUND

In the field of construction equipment there are a number of different working machines used to move, haul or dig material such as soil, gravel, rocks etcetera.

In connection with transportation of heavy loads, e.g. in contracting work, dump vehicles of the type of articulated haulers (also called frame-steered vehicles or dumpers) are frequently used. Such vehicles may be operated with large and heavy loads in areas where there are no roads, for example for transports in connection with road or tunnel building, sand pits, mines and similar environments.

A dump vehicle comprises a forward vehicle section (a so-called engine unit) which in turn comprises a forward frame, an engine, a cab, and a forward propulsion axle supported by the frame. The dump vehicle further comprises a rear vehicle section (a so-called load-carrying unit) which in turn comprises a rear frame, a tiltably arranged container for carrying loads, and one or two rear propulsion axles supported by the frame.

The frame of the engine unit is connected to the frame of the load-carrying unit by means of a special articulation joint allowing the engine unit and the load-carrying unit to pivot in relation to each other about an imaginary axis extending in the longitudinal direction of the vehicle. Thanks to the articulation joint, the engine unit and the load-carrying unit are allowed to move substantially independently of each other.

However, when the dump vehicle encounters large irregularities in the ground or terrain it is traveling on, such as e.g. large rocks, the load carrying unit may tip over sideways or rollover, and/or the driver in the cab of the engine unit may experience heavy disturbances due to tilting of the engine unit. The latter may cause the driver to lose control over the dump vehicle.

SUMMARY

In view of the above-mentioned and other drawbacks of the prior art, the object of the present inventive concept is to provide a working machine having a propulsion axle suspension arrangement and to a method for suspending a working machine, which at least alleviates above mentioned problems.

According to a first aspect of the invention, the object is achieved by a working machine according to claim 1. More specifically, the invention relates to a working machine comprising:

a working machine frame, at least one propulsion axle having an elongated main body comprising a first end portion, a second end portion and a center portion arranged between said first and second end portions, each one of said first and said second end portions being adapted to be equipped with a propulsion hub for driving a working machine propulsion means, said elongated main body having a main body length extending from said first end portion to said second end portion, a propulsion axle suspension arrangement arranged between said working machine frame and said propulsion axle, said propulsion axle suspension arrangement comprising a first suspension device and a second suspension device arranged on opposite sides of a center of the elongated main body, wherein said first and second suspension devices are arranged in the center portion of the elongated main body.

By the provision of a working machine where said first and second suspension devices are arranged in the center portion of the elongated main body, a relatively large pivoting movement of propulsion axle can be achieved. Thus, the working machine may absorb road irregularities in an improved manner. For example the working machine may absorb larger irregularities, such as e.g. large rocks, compared to solutions where the suspension devices are arranged outside of the center portion of the elongated main body. Thus, the risk of sideways tilting of the working machine is reduced.

Thus, by having the first and second suspension devices arranged in the center portion of the elongated main body of the propulsion axle, a relatively large pivoting movement of the propulsion axle can be achieved. One reason for this is the relatively short stroke length, or distance between the first and second suspension devices. Stated differently, as the suspension coupling between the working machine frame and the propulsion axle is limited to center portion of the elongated main body of the propulsion axle, the pivoting movement of the propulsion axle can be improved. Moreover, by arranging the first and second suspension devices in the center portion of the elongated main body, the shear forces in the first and second suspension devices can be kept relatively low. Another advantage of this configuration is that the applied forces to the working machine frame is lower compared to prior art solutions, and thus the working machine frame may be made simpler and possibly cheaper. For example, the working machine frame may be bolted instead of welded.

It should be understood that the main body length is, according to one embodiment, the total length of the elongated main body. That is, the main body length may be described as extending from a first end of the elongated main body, said first end being comprised in said first end portion, to a second, opposite end of the elongated main body, said second end being comprised in said second end portion.

According to one embodiment, said length of the elongated main body is the same as the length, or total length, of the propulsion axle. Thus, the propulsion axle may be divided into corresponding first and second end portions as well as a corresponding center portion. In other words, the first and second suspension devices may be described as being arranged in the center portion of the propulsion axle.

It should be understood that the elongated main body may for e.g. for production process reasons, be divided into several sub-portions, where the sub-portion is connected to each other so as to form an elongated main body. In other words, the elongated main body need not to, but may, be made in one piece.

According to one embodiment, the center of a component is the respective geometric center. Thus, it should be understood that the center of the elongated main body may refer to the geometric center of the elongated main body, i.e. a center within the elongated main body positioned in the center portion. Correspondingly, a center of the propulsion axle may be understood as the geometric center of the propulsion axle, which in at least some embodiments coincides with the center of the elongated main body.

According to one embodiment, each one of said first and second suspension devices hold a suspension fluid. The suspension fluid may e.g. be air or compressed gas, or alternatively hydraulic oil.

According to one embodiment, said center portion is centrally arranged on said elongated main body, and is delimited to be at most 50% of the main body length.

It should be understood that the term "delimited to be at most 50% of the main body length" means that the extension of the center portion, in the same direction as the main direction of the elongated main body, makes up at most 50% of the total length of the elongated main body.

According to one embodiment, the center portion is delimited to be at most 45%, or at most 40%, or at most 35%, or at most 30%, or at most 25%, or at most 20% or at most 15%, or at most 10% of the main body length.

According to one embodiment, the center portion is centrally arranged about a center, or geometric center, of the elongated main body. According to one embodiment, the center portion is symmetrically arranged about the center, such as the geometric center, of the elongated main body.

According to one embodiment, said first suspension device is arranged closer to the center of the elongated main body than to the first end portion (or first end of the elongated main body), and said second suspension device is arranged closer to the center of the elongated main body than to the second end portion (or second end of the elongated main body).

According to one embodiment the roll center, or roll axis, of the propulsion axle is centrally positioned between said first and said second suspension devices. Thus, as the first and second suspension devices are arranged between the propulsion axle and the working machine frame, the roll center, or roll axis, will be positioned above the propulsion axle and the elongated main body. Hereby, the pivoting movement of the propulsion axle will pivot about a point or axis positioned above the propulsion axle and the elongated main body.

According to one embodiment, said elongated main body is formed and sized to be mechanically coupled to said working machine frame.

According to one embodiment, the working machine further comprising a linkarm arrangement pivotably connecting said propulsion axle with said working machine frame such that the roll axis of the propulsion axle relative the working machine frame is comprised in said linkarm arrangement, wherein at least the portion of the linkarm arrangement comprising the roll axis is positioned above the center portion of said propulsion axle.

Hereby, the propulsion axle can pivot to a larger degree without the working machine risking to rollover. Thus, larger irregularities in the ground can more easily be overcome and run over by the working machine.

According to one embodiment, said linkarm arrangement is positioned in a plane above said center portion of said elongated main body.

According to one embodiment said linkarm arrangement comprises two linkarms, and a propulsion axle connection hub, each one of said two linkarms having a respective propulsion axle end portion connected to the propulsion axle connection hub, and a respective frame end portion connected to said working machine frame. The two linkarms may preferably form a V-shaped link. Hereby, the linkarm arrangement prevents the propulsion axle to be pivoted in an undesired direction. Moreover, the roll axis of the propulsion axle is according to one embodiment comprised in the propulsion axle connection hub. Even more specifically, in one embodiment, the roll axis of the propulsion axle is positioned in the same horizontal plane as the propulsion axle end portions of the two linkarms.

In one embodiment the V-shaped link is formed by the link arms are co-axially or closely arranged onto the connection hub at their propulsion axle end portion, and transversally distanced at their frame end portion.

For example, the propulsion axle connection hub of the linkarm arrangement may be a projection extending from the center portion of the elongated main body towards the working machine frame, e.g. in the vertical direction. The two link arms may be connected to said connection hub in order to connect the propulsion axle to the working machine frame.

It should be understood that the center portion of the elongated main body may have a different size and shape than the first and second end portions. For example, the center portion, or at least a portion of the center portion, may have a larger extension in the vertical direction compared to the first and second end portions. Thus, the center portion, or at least a portion of the center portion, may be formed as a bulb or ramp on the elongated main body. In such embodiments, the propulsion axle connection hub may be formed as a projection extending upwards from this bulb or ramp. Thus, the connection to the two linkarms may be made at an even higher position compared to an elongated main body not having such bulb or ramp and/or the propulsion axle connection hub may be made shorter.

According to one embodiment, the working machine comprises a rolling bearing comprised in the connection between the propulsion axle connection hub and the two linkarms.

According to one embodiment, the ratio of a first parameter A defined as the shortest distance between the center of the elongated main body and the roll axis of the propulsion axle, and a second parameter B defined as the shortest distance between the center of the elongated main body and ground is between 0.35 and 1.0, preferably between 0.55 and 0.75, and more preferably between 0.65 and 0.75.

As the roll axis is comprised in said linkarm arrangement, the first parameter A may also be defined as the shortest distance between the center of the elongated main body and the linkarm arrangement.

According to one embodiment, the shortest distance between the center of the elongated main body and the roll axis of the propulsion axle is between 200 mm and 500 mm, preferably between 300 mm and 400 mm.

Correspondingly, as the roll axis is comprised in said linkarm arrangement, the shortest distance between the center of the elongated main body and the roll axis of the propulsion axle, may be determined as the shortest distance between the center of the elongated main body and the linkarm arrangement.

According to one embodiment, the working machine according further comprises said first and second propulsion hubs for driving a working machine propulsion means, wherein the roll axis is positioned above the respective upper ends of the first and second propulsion hubs.

Stated differently, a first horizontal plane may be defined as extending through the upper ends of the first and second propulsion hubs, and the roll axis of the propulsion axle is thus positioned above said first horizontal plane. Correspondingly, as the roll axis is comprised in said linkarm arrangement, the linkarm arrangement is positioned (at least partly) above the first horizontal plane.

According to one embodiment said propulsion axle suspension arrangement further comprises a fluid communication path configured to enable suspension fluid communication between said first suspension device and said second suspension device. Thus, fluid may be exchanged by the first and second suspension device via said fluid communication path.

According to one embodiment said fluid communication between said first suspension device and said second suspension device via said fluid communication path is passively unregulated. In other words, according to such embodiments, there are no vents or valves regulating the flow of fluid through said fluid communication path. According to one alternative embodiment the fluid communication path is provided with a throttle and/or can be shut off by a shut-off valve.

The propulsion axle suspension arrangement may generally be described as having at least two modes, a non-compensation mode and a compensation mode. In the non-compensation mode, there is no net exchange of fluid between the first and second suspension devices, and in the compensation mode, fluid is exchanged between the first and second suspension devices via said fluid communication path. The non-compensation mode may e.g. occur during driving of the working machine on a flat road, i.e. where the first and second suspension devices are subject to equal loads. The compensation mode may e.g. occur during turning, or heavy turning of the working machine, or when encountering road irregularities.

In the compensation mode, suspension fluid is transported from the first suspension device to the second suspension device, or from the second suspension device to the first suspension device, via said fluid communication path. For example, if the first propulsion means, such as a first wheel, is to climb over a rock, the first suspension device will be compressed whereby suspension fluid from the first suspension device will be transported into the second suspension device via said fluid communication path. Thus, the working machine frame may be held relatively stable (i.e. being held in more or less the same horizontal plane), as the first and second suspension devices compensate for the road irregularities.

According to one embodiment said propulsion axle suspension arrangement is at least partly pneumatically driven. Thus, a relatively cheap suspension fluid can be used, while still reaching a sufficient functionality.

According to one embodiment, said first suspension device comprises a first air bellow, and said second suspension device comprises a second air bellow. Thus, a relatively cheap propulsion axle suspension arrangement can be used, while still reaching a sufficient functionality.

According to one embodiment each one of, or only one of, the first and second suspension devices may be equipped with a level-regulating valve. Hereby, the total amount of suspension fluid in the propulsion axle suspension arrangement can be varied, and the level of the working machine frame and/or the distance between the propulsion axle and the ground can be adjusted accordingly. In embodiments where the propulsion axle arrangement is at least partly pneumatically driven, the level-regulating valve may be connected to a main pressure line and can be shut off with respect thereto. The main pressure line can be connected via a main pressure valve alternately to a compressed air source and to a compressed air sink.

According to one embodiment said propulsion axle suspension arrangement is at least partly hydraulic driven. Hereby, the suspension fluid of working machine can be adapted to the working conditions.

According to one embodiment, said working machine comprises a propulsion means linkarm connecting the propulsion means of said propulsion axle directly to the working machine frame. Hereby, the propulsion axle is prevented from pivoting in the longitudinal direction (e.g. prevented from pivoting forwards and backwards).

According to one embodiment the working machine, and its components, can be described as having a height, a width and a length. The width of the working machine extends in the same direction as the main direction of the elongated main body of the propulsion axle, which may be referred to as a transversal direction, the length of the working machine extends along the longitudinal direction of the working machine, the longitudinal direction being perpendicular to the transversal direction of the working machine, and the height of the working machine extends in a direction being perpendicular to both the longitudinal and transversal directions. Thus, the roll axis of the propulsion axle, or for embodiments where two propulsion axles are described the roll axis of the first propulsion axle and the second propulsion axle, extends in the longitudinal direction.

According to one embodiment the extension of the working machine may be defined in a x, y, z coordinate system, where the x-direction extends in the longitudinal direction and thus along the length of the working machine, the y-direction extends in the transversal direction, and thus along the width of the working machine, and the z-direction extends in a direction being perpendicular to both the x and y-directions, and thus along the height of the working machine. When described in the x, y, z coordinate system, the roll axis of the propulsion axle is positioned higher, i.e. the z-value is higher, compared to the center portion (or geometrical center) of the of the elongated main body of said propulsion axle. For embodiments where two propulsion axles are described, the roll axis of the first propulsion axle and the second propulsion axle, are positioned higher, i.e. the z-value is higher, compared to the respective center portion (or geometrical center) of the of the elongated main body of the first and the second propulsion axle, respectively.

Also described in the x, y, z coordinate system, the linkarm arrangement is positioned in an x, y plane above (i.e. higher or having a higher z-value) said center portion (or geometric center) of the elongated main body of the propulsion axis.

Optionally, the working machine is a self-propelled working machine.

Optionally, the working machine is a driverless working machine.

Optionally, the working machine comprises propulsion means, such as wheels or crawlers, for propelling the working machine.

According to a second aspect of the invention, the object is achieved by a method for suspending a working machine relative a propulsion axle according to claim 13.

Thus, the invention relates to a method for suspending a working machine relative a propulsion axle, the method comprising the steps of:

providing a propulsion axle having an elongated main body comprising a first end portion, a second end portion and a center portion arranged between said first and second end portions, each one of said first and said second end portions being adapted to be equipped with a propulsion hub for driving a working machine propulsion means, said elongated main body having a main body length extending from said first end portion to said second end portion; and a propulsion axle suspension arrangement comprising a first suspension device and a second suspension device, each one of said first and second suspension devices holding a suspension fluid, arranging said first suspension device and said second suspension device on opposite sides of a center of the elongated main body, and in the center portion of the elongated main body.

Effects and features of this second aspect of the present invention are largely analogous to those described above in connection with the first aspect of the inventive concept. Embodiments mentioned in relation to the first aspect of the present invention are largely compatible with the second aspect of the invention.

For example, and according to one embodiment, said center portion is centrally arranged on said elongated main body, and is delimited to be at most 50% of the main body length.

According to one embodiment, the center portion is delimited to be at most 45%, or at most 40%, or at most 35%, or at most 30%, or at most 25%, or at most 20% or at most 15%, or at most 10% of the main body length.

According to one embodiment said step of arranging said first suspension device and said second suspension device comprises arranging said first suspension device closer to the center of the elongated main body than to the first end portion, and arranging said second suspension device closer to the center elongated main body than to the second end portion.

According to one embodiment the method further comprising arranging a propulsion axle connection to the working machine frame (such as the previously described propulsion axle connection hub and linkarm arrangement) above the propulsion axle such that a roll center, or roll axis, of the propulsion axle is centrally positioned between said first and said second suspension devices.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
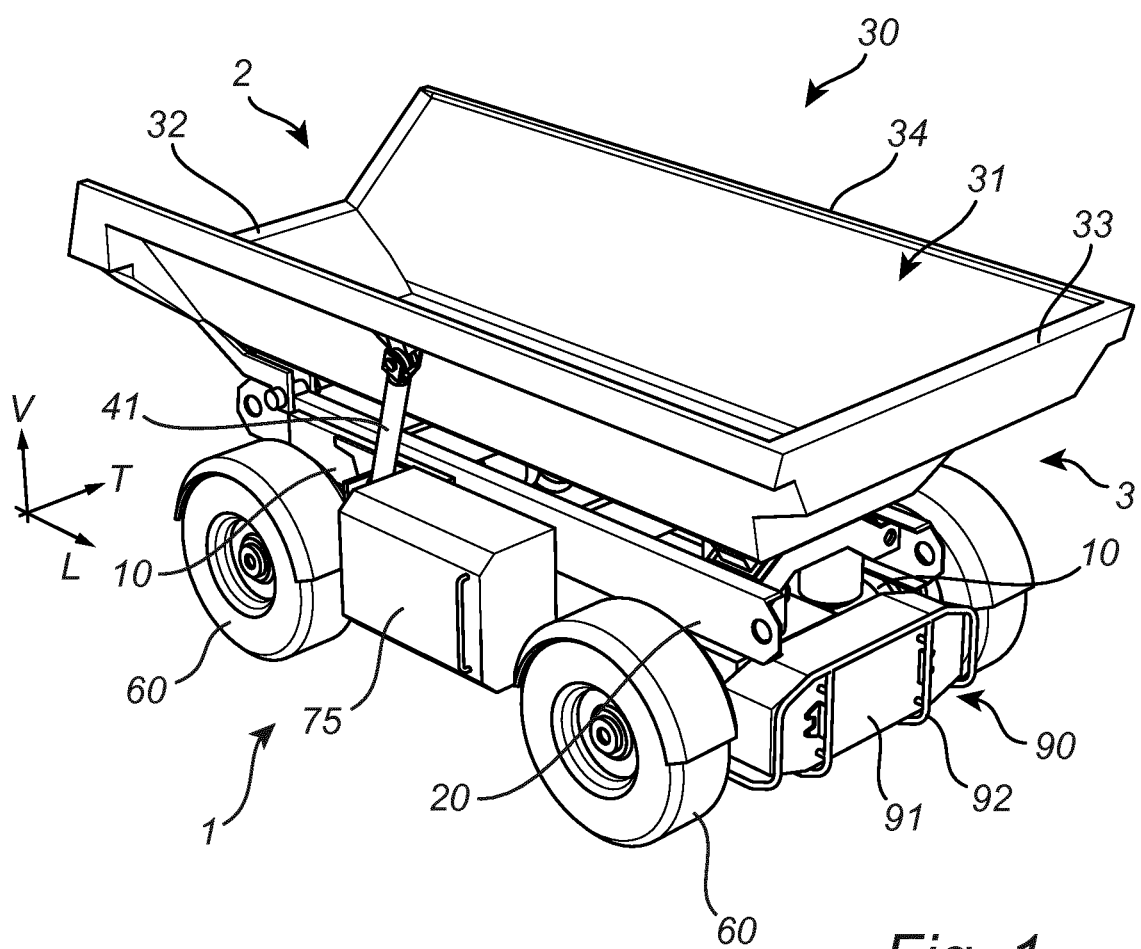
FIG. 1 is a perspective view of a working machine according to one embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In the following, a working machine 1 is described. The inventive concept is applicable on any working machines within the fields of industrial construction machines or construction equipment, in particular dumpers/haulers. Although the invention will be described with respect to a hauler, the invention is not restricted to this particular machine, but may also be used in other working machines such as articulated haulers, excavators, backhoe loaders and wheel loaders.

As seen in FIG. 1 the working machine comprises a dump body 30 for accommodating a load. Merely as an example, and as is indicated in FIG. 1, the dump body 30 may be a loading platform of the working machine 1. The working machine 1 is adapted to have a load receiving condition in which the dump body 30 comprises an open load receiving area 31 outwardly delimited by a load receiving area circumference 34. In FIG. 1 an embodiment is shown where the working machine 1 is adapted to assume the load receiving condition in a normal state. In other words, the working machine 1 embodiment illustrated in FIG. 1 comprises a dump body 30 which always comprises an open load receiving area 31 outwardly delimited by a load receiving area circumference 34. However, it is also envisioned that embodiments of the working machine may comprise cover means (not shown), such as a lid, that is adapted to cover at least a portion of the dump body 30 and which cover means can be moved in order to obtain the open load receiving area 31 to thereby arrive at the open load receiving area 14. Generally, the open load receiving area 31 may be an area that is directly accessible from the environment surrounding the working machine 1. For instance, the open load receiving area 31 may be an area that is directly accessible from the above of the dump body 30.

The working machine does not have a driver seat, but is intended to be autonomously and/or remotely driven. The machine further comprises a first side 3 and a second side 2 arranged opposite to the first side 3, the second side 2 being a load dumping side 2. The first side 3 may also be referred to as an opposite side 3. The opposite side 3 may be used as a front end side when the machine is driven in the direction that puts the opposite side 3 first. However, the working machine 1 may be drivable in any direction, i.e. it is bidirectional. Further, the dump body 30 comprise a load dumping end portion 32 arranged on the working machines load dumping side 2, and an opposite end portion 33 arranged on the working machines opposite side 3.

Further, still refereeing to FIG. 1 the working machine 1 comprise a working machine frame 20 to which a pair of propulsion axles 10 are mounted. The working machine frame 20 further supports the dump body 30, and thereby carries the load of anything contained in the dump body 30 as well as the weight from the dump body itself. The propulsion axles 10 are equipped with a propulsion hub 14 (not shown in FIG. 1) for driving propulsion means 60. In the figures the propulsion means 60 are illustrated as wheels, however, they may also be crawlers.

Further, an electrical engine 70 is installed onto the propulsion axle 10 being coupled to a drive shaft (not shown). The electrical engine 70 is mounted onto a front side of the propulsion axle's 10 elongated main body, said front side facing away from a center of the working machine 1. The working machine may comprise one electrical engine 70 on each machine axle 10.

Figure 3:
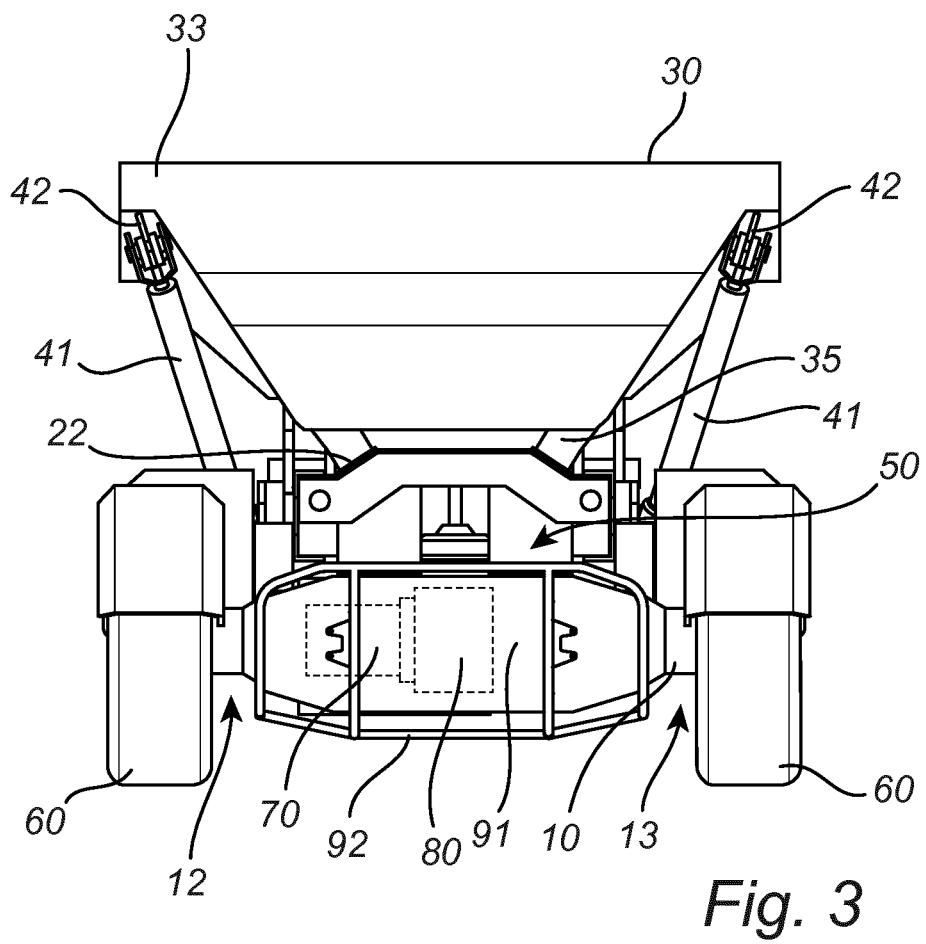
FIG. 3 is a front view of a working machine according to one embodiment of the invention.

Further, the working machine 1 may comprise a tilting arrangement 40, such as a tilting arrangement comprising one or more tilting actuators 41, such as hydraulic actuators, for tilting the dump body 30 of the working machine 1. The tilting arrangement 40 is in one end attached to the frame 20 and in the other end to the dump body 30. Preferably, the tilting arrangement 40 comprise two tilting actuators 41 arranged at different sides of the dump body to ensure a stable tilting (as shown in FIG. 3).

Figure 2:
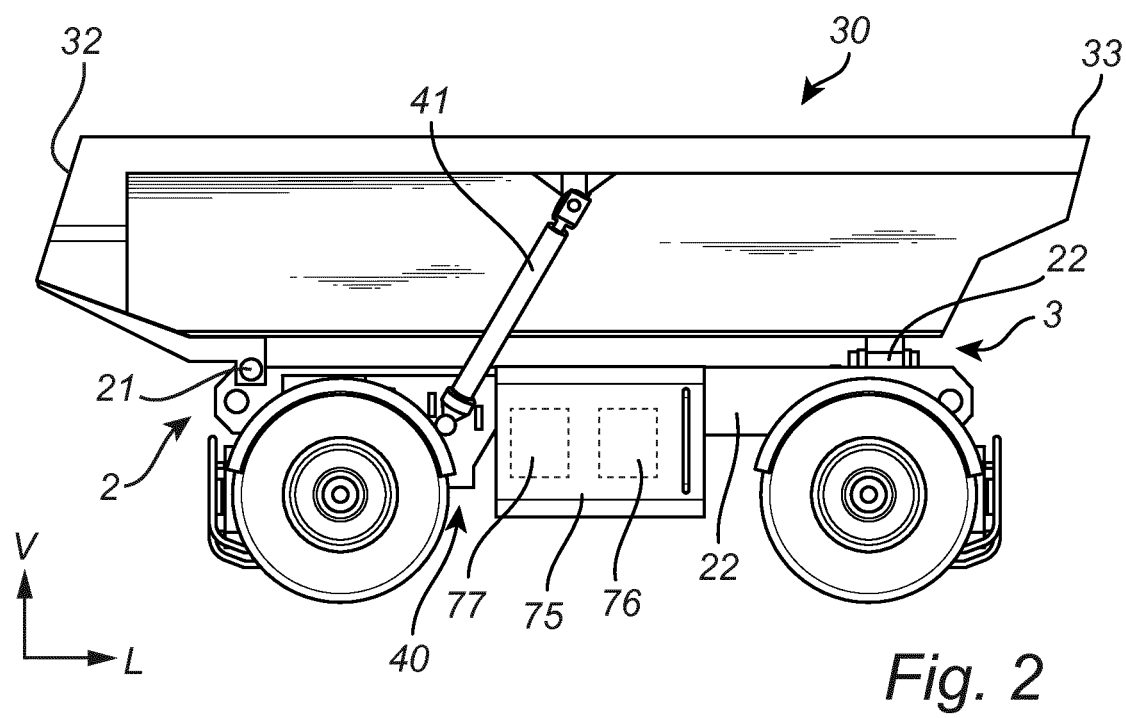
FIG. 2 is a side view of a working machine according to one embodiment of the invention.

FIG. 1 finally disclose an electrical control arrangement 75, arranged to the frame of the working machine 1. The electrical control arrangement 75 may comprise (as illustrated in FIG. 2) a power source 76 e.g. a battery arrangement, for supporting the electrical engine(s) 70 and any other components with power. Further, the electrical control arrangement 75 may comprise a control unit 77 for controlling the working machine. The control unit 77 may be capable of receiving a remote control signal to enable the working machine to be remotely controlled. Such a signal may be received from an external transmission unit (not shown). It may further be capable of communicating any information to or from the working machine from or to a remote server (not shown). Such information may comprise usage data, service information, battery status, load, weight, capacity utilization or any other relevant information.

The load receiving area circumference 34 may form a closed loop that fully encloses a continuously open load receiving area 31. However, some embodiments of the working machine 1 may comprise one or more internal partitioning walls partitioning the open load receiving area 31 into two or more compartments (not shown).

The propulsion axle arrangement 10 also comprises a cover arrangement 90 for covering the electrical engine, wherein the cover arrangement comprises a first (inner) cover 91 and a second cover 92 being arranged on the outside of the first cover.

Turning to FIG. 2, being the side view of the same embodiment of the vehicle, the working machine frame 20 is clearly illustrated as being coupled the propulsions means 60, i.e. the wheels, (via the propulsion axle, which is not seen in this view). Further, the illustration shows that the dump body 30 rests on the working machine frame 20. However, in the illustrated embodiment it is not in contact with the frame 20 during its whole length, but rather at the load dumping side 2 at an attachment means 21 being a pivotal arrangement allowing the dump body 30 to pivot relative the frame 20. The dump body 30 further rests on the frame 20 at a guiding plate portion 22, which will be further described in relation to FIG. 3. Further, the tilting arrangement 40, with one of the side's tilting actuators 41 is clearly sown in FIG. 2. The tilting actuator 41 is in one end attached to the frame 20 and in the other end to the dump body 30. Further, the tilting actuator may be extended so that the dump body's opposite end portion 33 is elevated. Preferably, the tilting arrangement 40 comprise two tilting actuators 41 arranged at different sides of the dump body to ensure a stable tilting, and to spread the load on two actuators enabling a lower dimension of the tilting actuators for the same load.

As is also clearly shown in FIGS. 1 and 2, the working machine 1 extends in at least a longitudinal direction L, a vertical direction V and a transversal direction T. The longitudinal direction L is parallel to an intended direction of travel of the working machine 1. Further the transversal direction T is perpendicular to each one of the vertical direction V and the longitudinal direction L. That is, the transversal direction T is parallel to the general extension of the propulsion axles 10. These directions are intended to be interpreted relative the working machine, and should not be interpreted as being dependent of the vehicle's orientation.

Further, the electrical control arrangement 75 is illustrated in the side view of FIG. 2. The placement of the electrical control arrangement 75 should only be considered to be an example. It is preferably arranged between the two working machine axles 10 and coupled to the frame 20, but the exact placement may be chosen in so that it is functionally placed in the environment which the working machine is to be used. Having the electrical control arrangement 75 on the outside of the frame, so that it is accessible from the side of the vehicle gives that advantage that both maintenance is facilitated and that any transceiving unit in the control arrangement, sending and/or receiving information may obtain a better signal and/or range. However, it would be possible to place the electrical control arrangement 75 transversally central on the working machine, i.e. under the dump body 30.

The dump body 30 of the working machine may further be designed so that the working machine 1 can assume a position relative to a second working machine of the same type, in which position the dump bodies at least partly overlap in at least the longitudinal or transversal direction. Generally, overlap of the dump bodies may be obtained on any side of the working machines 1. For instance, the overlap may be obtained along the longitudinal sides or the transversal sides of the working machines 1. For example, the above overlap may be at least 2%, preferably at least 5%, more preferred at least 8% of the load receiving length of the open load receiving area 31 in said longitudinal direction L.

Further, in FIG. 3 the working machine is shown in a front view, in one embodiment of the invention. In the front view, the working machine 1 is illustrated from one of the transversal sides, and more specifically from the side called the opposite side 3, being the side opposite of the load dumping side 2. The frame 20 is coupled to the propulsion axle 10, via the suspension arrangement 50 allowing the frame 20 to move relative the propulsion axle 10 in the vertical plane. Further, the propulsion axle comprises two opposing end portions 12, 13 each having a propulsion hub (not shown) coupled the propulsions means 60, i.e. the wheels in this embodiment. Further, the dump body 30 rests on the working machine frame 20 at a guiding plate portion 22. The dump body 30 comprise a load supporting end portion 35, which cooperates with a guiding plate portion 22 and works as a guiding means for guiding the dump body towards a transversally centered position during a pivotal downward movement of the dump body relative the frame. The formation of these guiding plate portions and load supporting end portions may be formed with an angle to a horizontal plane, i.e. with a vertical inclination. Further, the tilting arrangement 40 is clearly shown having two tilting actuators 41 arranged on each longitudinal side of the dump body. The tilting actuators 41 are attached to the dump body 30 at its top portion in a rotational coupling 42. Further, the tilting actuator may be extended so that the dump body's opposite end portion 33 is inclined. Finally, FIG. 3 illustrates that the propulsion axle is equipped with an electrical engine 70 being drivably coupled to a drive shaft inside the propulsion axle (thus not shown) and mounted onto the illustrated front side 16 of the elongated main body 11, said front side 16 facing away from a center of the working machine 1 in the transversal direction. This is further illustrated in the subsequent figures. In FIGS. 1-3 the electrical engine 70 and gear box 80 are hidden by the engine cover 90, and is thus only noted with a dashed line in FIG. 3.

Figure 4:
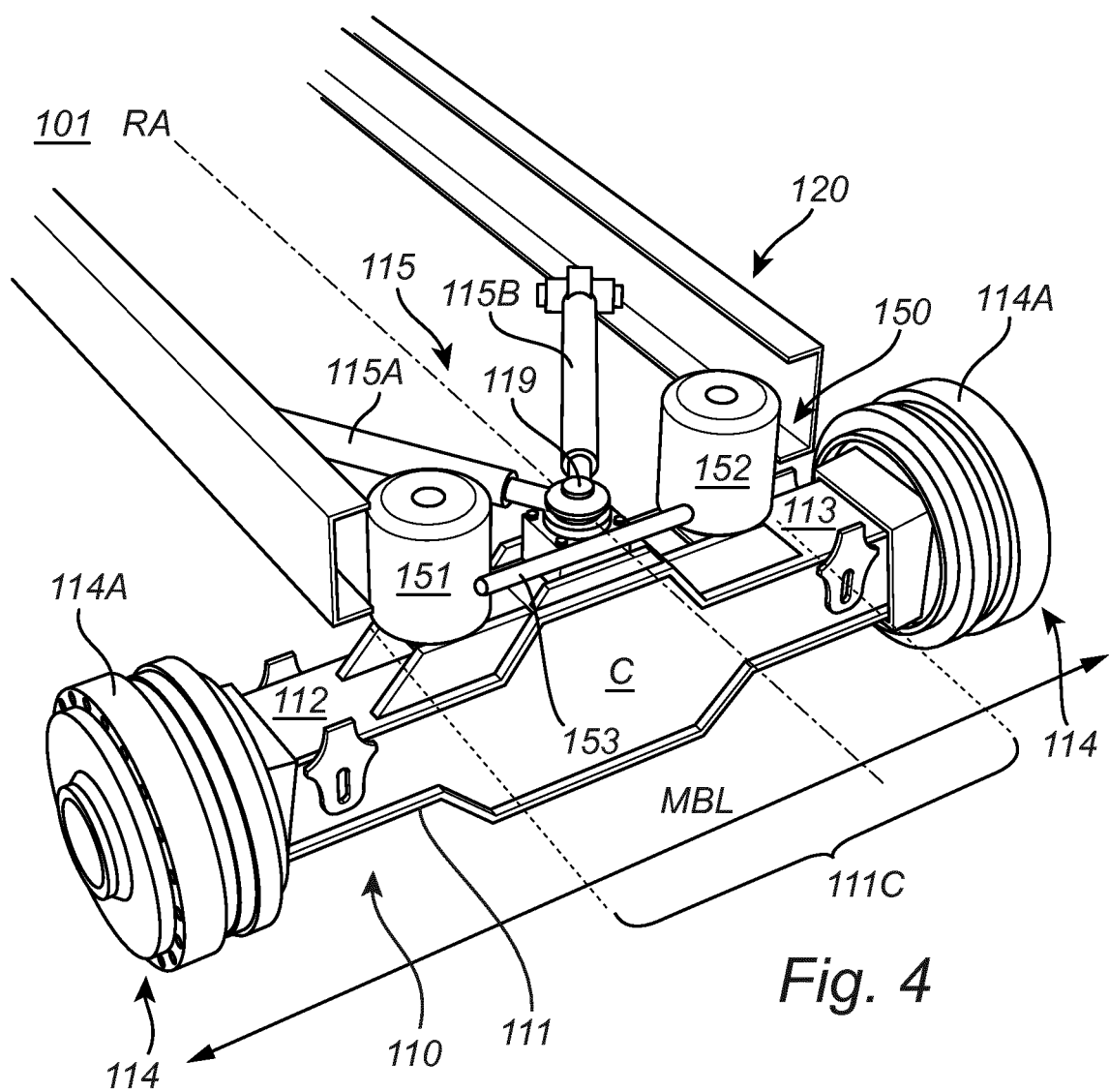
FIG. 4 is a perspective view of a portion of the working machine including a propulsion axle according to one embodiment of the invention.
Figure 5:
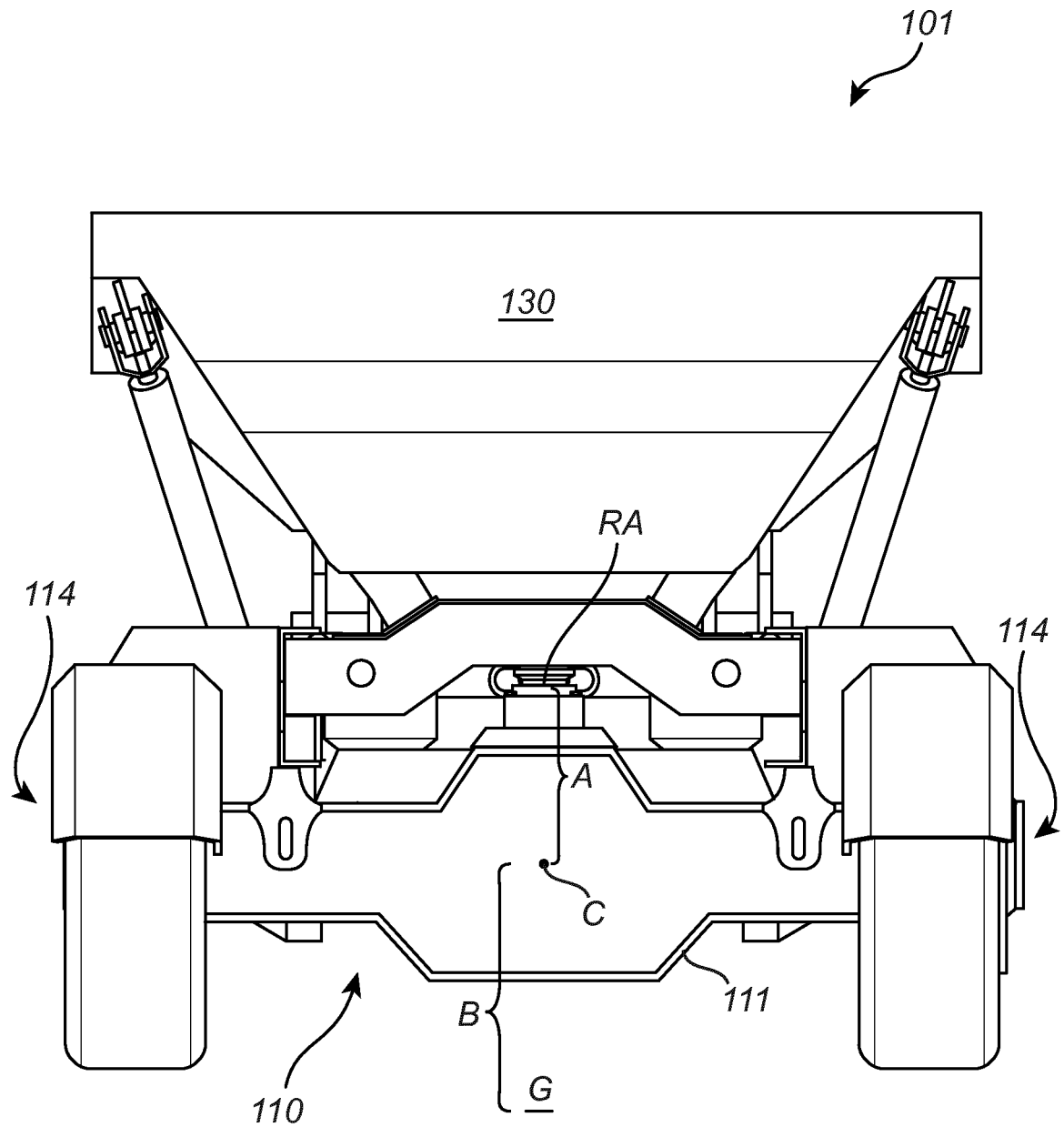
FIG. 5 is a front view of a working machine according to one embodiment of the invention.

In FIG. 4 and FIG. 5 a working machine 101 according to one embodiment is shown. In FIG. 4 a perspective view of a portion of the working machine 101 is shown, and in FIG. 5 a front view of the working machine is shown. The configuration shown in FIGS. 4 and 5 is applicable to the working machine 1 shown in FIGS. 1-3. Moreover, as the working machine 101 in FIGS. 4 and 5 comprises the same or similar features and components as the working machine 1 in FIGS. 1-3, similar reference numerals are used for corresponding features, but with the addition of "100".

In FIG. 4, a working machine frame 120 and one propulsion axle 110 having an elongated main body 111 comprising a first end portion 112, a second end portion 113 and a center portion 111C arranged between the first and second end portions 112, 113, is shown. Each one of the first second end portions 112, 113 is here equipped with a respective propulsion hub 114 for driving a working machine propulsion means such as e.g. a wheel. The elongated main body 111 has a main body length MBL extending from the first end portion 112 to the second end portion 113.

Also shown in FIG. 4 is a propulsion axle suspension arrangement 150 arranged between the working machine frame 120 and the propulsion axle 110. Note than in FIG. 4, a portion of the working machine frame 120 covering the suspension arrangement 150 from above is removed for clarity reasons. The propulsion axle suspension arrangement 150 comprises a first suspension device 151 and a second suspension device 152 arranged on opposite sides of a center C of the elongated main body 111, each one of the first and second suspension devices 151, 152 is holding a suspension fluid (not shown).

As can be seen in FIG. 4, the first and second suspension devices 151, 152 are arranged in the center portion 111C of the elongated main body 111. In FIG. 4, the center portion is centrally arranged on the elongated main body 111, and is delimited to be closer to, but not higher than, 50% of the main body length MBL.

As also shown in FIG. 4, the propulsion axle suspension arrangement 150 further comprises a fluid communication path 153 configured to enable suspension fluid communication between the first suspension device 151 and the second suspension device 152. Thus, fluid may be exchanged by the first and second suspension device 151, 152 via the fluid communication path 153. In FIG. 4, the fluid communication path 153 is passively unregulated. In other words, according to such embodiments, there are no vents or valves regulating the flow of fluid through the fluid communication path 153.

Preferably, the propulsion axle suspension arrangement 150 of FIG. 4 is at least partly pneumatically driven. Thus, in such embodiments the first suspension device 151 is a first air bellow 151, and the second suspension device 152 is a second air bellow 152.

In FIG. 4, a linkarm arrangement 115 is pivotably connecting the propulsion axle 110 with the working machine frame 120. The linkarm arrangement 115 comprises two linkarms 115A, 115B, and a propulsion axle connection hub 119, each one of the two linkarms 115A, 115B has a respective propulsion axle end portion connected to the propulsion axle connection hub 119, and a respective frame end portion connected to the working machine frame 120. The two linkarms 115A, 115B is in FIG. 4 forming a V-shaped link. Hereby, the linkarm arrangement prevents the propulsion axle to be pivoted in an undesired direction.

The roll axis RA of the propulsion axle relative the working machine frame is comprised in the linkarm arrangement 115. As the linkarm arrangement 115 is positioned above the center portion 111C of the elongated main body 111, the roll axis RA (and roll center) of the propulsion axle 110 is positioned above the center portion 111C of the elongated main body 111. In FIG. 4, the roll axis RA (and roll center), as well as at least a part of the linkarm arrangement 115, such as the propulsion axle connection hub 119, is centrally positioned between the first and the second suspension devices 151, 152.

The positioned of the roll axis RA above the propulsion axle 110 can be defined differently. For example, the roll axis may be defined as being positioned above the respective upper ends 114A of the first and second propulsion hubs 114.

Turning now to FIG. 5, showing a front view of the working machine 101 in full. That is, besides the components described in FIG. 4, the working machine 101 in FIG. 5 further comprise inter alia: a dump body 130, and wheels as propulsion means attached to the propulsion hubs 114 (shown in FIG. 4).

In FIG. 5, it is clearly shown that the roll axis RA is positioned above the propulsion axle 110. As shown in FIG. 5, a ratio of a first parameter A defined as the shortest distance between the center C of the elongated main body 111 and the roll axis RA of the propulsion axle 110, and a second parameter B defined as the shortest distance between the center C of the elongated main body 111 and ground G is approximately 0.8. According to one embodiment the ration between A and B is somewhere between 0.35 and 1.0.

It is to be understood that the present invention is not limited to the embodiments described above and illustrated in the drawings; rather, the skilled person will recognize that many changes and modifications may be made within the scope of the appended claims.

The invention claimed is:

1. A working machine comprising
a working machine frame,
at least one propulsion axle having an elongated main body comprising a first end portion, a second end portion and a center portion arranged between said first and second end portions, each one of said first and said second end portions being adapted to be equipped with a propulsion hub for driving a working machine propulsion device, said elongated main body having a main body length extending from said first end portion to said second end portion, and
a propulsion axle suspension arrangement arranged between said working machine frame and said propulsion axle, said propulsion axle suspension arrangement comprising a first suspension device and a second suspension device arranged on opposite sides of a center of the elongated main body,
wherein said first and second suspension devices are arranged in the center portion of the elongated main body.

2. A working machine according to claim 1, wherein said center portion is centrally arranged on said elongated main body, and is delimited to be at most 50% of the main body length.

3. A working machine according to claim 1, wherein said first suspension device is arranged closer to the center of the elongated main body than to the first end portion, and said second suspension device is arranged closer to the center of the elongated main body than to the second end portion.

4. A working machine according to claim 1, wherein the roll center of the propulsion axle is centrally positioned between said first and said second suspension devices.

5. A working machine according to claim 1, further including a linkarm arrangement pivotably connecting said propulsion axle with said working machine frame such that the roll axis of the propulsion axle relative the working machine frame is included in said linkarm arrangement, wherein at least the portion of the linkarm arrangement including the roll axis is positioned above the center portion of said propulsion axle.

6. A working machine according to claim 5, wherein the ratio of a first parameter A defined as the shortest distance between the center of the elongated main body and the roll axis of the propulsion axle, and a second parameter B defined as the shortest distance between the center of the elongated main body and ground is between 0.35 and 1.0, preferably between 0.55 and 0.75, and more preferably between 0.65 and 0.75.

7. A working machine according to claim 5, wherein the shortest distance between the center of the elongated body and the roll axis of the propulsion axle is between 200 mm and 500 mm, preferably between 300 mm and 400 mm.

8. A working machine according to claim 5, further comprising first and second propulsion hubs for driving a working machine propulsion device, and wherein the roll axis is positioned above the respective upper ends of the first and second propulsion hubs.

9. A working machine according to claim 1, wherein said propulsion axle suspension arrangement further comprises a fluid communication path configured to enable suspension fluid communication between said first suspension device and said second suspension device.

10. A working machine according to claim 9, wherein said fluid communication between said first suspension device and said second suspension device via said fluid communication path is passively unregulated.

11. A working machine according to claim 1, wherein said propulsion axle suspension arrangement is at least partly pneumatically driven.

12. A working machine according to claim 11, wherein said first suspension device comprises a first air bellow, and said second suspension device comprises a second air bellow.

13. A method for suspending a working machine relative a propulsion axle, the method comprising:
providing a propulsion axle having an elongated main body comprising a first end portion, a second end portion and a center portion arranged between said first and second end portions, each one of said first and said second end portions being adapted to be equipped with a propulsion hub for driving a working machine propulsion device, said elongated main body having a main body length extending from said first end portion to said second end portion; and a propulsion axle suspension arrangement comprising a first suspension device and a second suspension device, each one of said first and second suspension devices holding a suspension fluid, and
arranging said first suspension device and said second suspension device on opposite sides of a center of the elongated main body, and in the center portion of the elongated main body.

14. A method according to claim 13, wherein said center portion is centrally arranged on said elongated main body, and is delimited to be at most 50% of the main body length.

* * * * *